July 1, 1958   W. E. W. PETTER   2,841,346
JET-PROPELLED AIRCRAFT
Filed June 29, 1953

Inventor
W. E. W. PETTER
by Wilkinson & Mawhinney
Attys.

United States Patent Office 2,841,346
Patented July 1, 1958

2,841,346

JET-PROPELLED AIRCRAFT

William Edward Willoughby Petter, Curdridge, England, assignor to Folland Aircraft Limited, Hamble, England, a British company Application June 29, 1953, Serial No. 364,579

Claims priority, application Great Britain June 30, 1952

3 Claims. (Cl. 244—117)

In aircraft which are jet-propelled or include a gas-turbine in the power unit, large quantities of air are consumed, and when the engine or engines are mounted in the fuselage, the problem of collecting the air from the free stream about the aircraft and ducting it to the engine is a major one. Air-duct entries at the nose of the aircraft are subjected to a disadvantage in that, since the engines are normally mounted in the fuselage some way back from the aircraft nose, long ducting is required, which occupies an undue amount of space in the body of the aircraft with consequent increase in weight and drag. The problem of air-collection becomes increasingly serious in the case of fighter aircraft in which very large engines are fitted in very small aircraft, so that the cross-sectional area required for the air-duct becomes an appreciable proportion of the fuselage cross-sectional area.

For this reason, it has been proposed to provide side-entry air-ducts, that is, ducts with intakes in the form of forwardly-facing scoops situated at the periphery of the fuselage some distance back from the nose; such intakes will normally be arranged in pairs, one at each side of the fuselage, but other arrangements are possible, for example, a single ventral intake may be provided. The air-duct from each intake leads rearwardly toward the engine which is to be supplied with air, and also runs inwardly in a smooth sweep or curve into line with the engine; if there are two or more intakes for a single engine the ducts from these usually join up just in front of the engine. For reasons of external drag, a streamlined fairing is normally necessary, outside the fuselage proper, to "fair off" each air intake, and on high speed machines this fairing may even need to extend right to the aft end of the fuselage. The present invention relates to an aircraft construction of this type, that is in which one or more scoop-style air-intakes are provided at the fuselage periphery, the rearwardly-extending air-duct or ducts from the intake or intakes being swept in to bring them into line with the engine to be supplied, and a fairing or fairings are provided to fair-off the air-intakes.

The present invention provides an aircraft construction of the type described, having an air-intake-opening situated outside the main structural members of the fuselage, and an air-duct extending therefrom through the structural members to the engine, and wherein the fairing extending aft from the air-intake-opening is spaced away from said duct by such a distance as to provide a compartment for ancillary or other equipment, such as an under-carriage or armament.

In the preferred form, the said compartment is bounded on its inner side by the wall, or main structural members, of the fuselage proper, and at least part of the outer wall of the air-duct may form part of or contribute to the strength of the fuselage wall. In this way, the main fuselage structure is not broken by the provision of the stowage compartment. The invention includes the combination of an aircraft constructed as above described with an undercarriage, armament, or other equipment mounted or stowed in the compartment between the fairing and the inward-running air-duct.

According to a feature of the invention the said equipment may comprise a gun or guns so mounted that their muzzles are directed out through the opening or lip of the air-intake.

A further feature of the invention is that the said equipment may comprise an ammunition box or boxes stowed in a convenient position relative to the gun.

According to another feature of the invention, the equipment may comprise an undercarriage leg pivotally mounted at its upper end within the compartment provided by the fairing and arranged to retreat upwardly about said pivot so as to lie within said compartment when retracted. Preferably, two air-intake-openings are provided arranged one on each side of the fuselage, each having a fairing so that two stowage compartments are afforded, and each of said two compartments houses an undercarriage leg when the aircraft undercarriage is retraced.

One form of construction in accordance with the invention will now be described by way of example, and with reference to the accompanying diagrammatic drawings in which.

Figure 1:
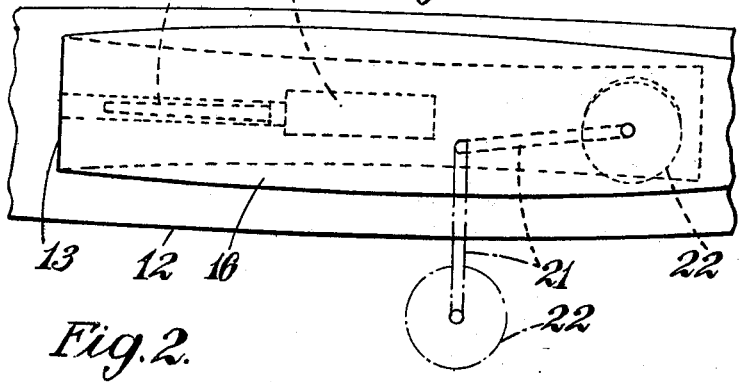
Figure 1 represents part of an aircraft fuselage in side elevation.
Figure 2:
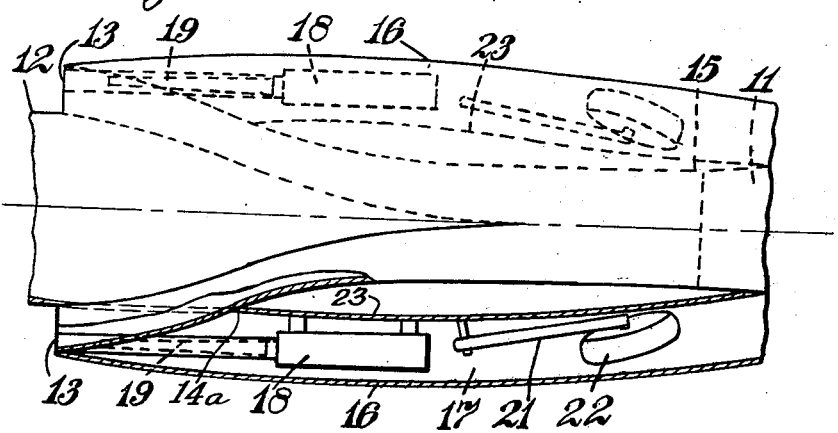
Figure 2 is a part sectional view on the line 2—2 of Fig. 3.
Figure 3:
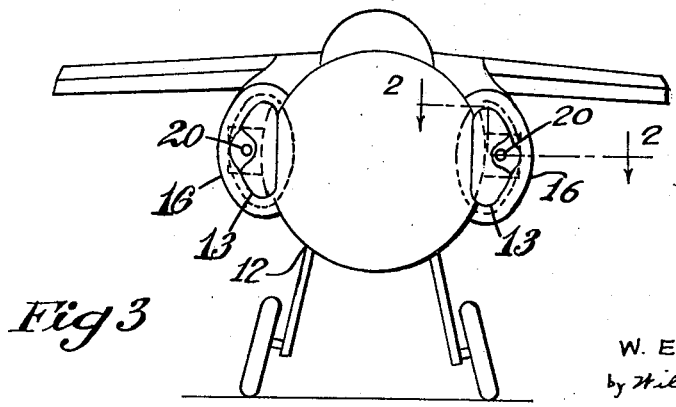
Figure 3 represents the fuselage in front elevation.

The drawings relate to an aircraft which is powered by a single-gas-turbine engine 11 mounted centrally in the fuselage 12 at a position some distance back from the nose thereof, and the engine is supplied with air by a pair of forwardly-facing air-intakes 13 located symmetrically one at each side of the fuselage at a position intermediate between the nose of the aircraft and the engine where the cross-section of the fuselage is still increasing. Each of the air-intakes 13 has an air-duct 14 extending rearwardly therefrom, and the two air-ducts are swept inward towards the centre line of the aircraft in smooth curves and join one another to form a single air-trunk 15 just in front of the engine 11. The air-intakes 13 are situated on the fuselage wall 23 externally of the main stress-carrying structural members forming said fuselage wall, so that each air-duct 14 passes through an aperture 14ᵃ formed in the side wall structure on its way to the engine, and the air-intakes are "faired-off" at the rear by stream-lined fairings 16 extending along the fuselage to the aft-end thereof. A boundary layer bleed may be provided beyond each air-intake, and this added to the fact that the intakes are positioned at a place where the fuselage cross-section is increasing helps to prevent turbulence of the air-stream due to breakaway of the boundary layer beyond the intakes and provides for satisfactory operational performance of the aircraft.

Thus, on each side of the aircraft there is a space 17 provided between the outer skin of the air-intake fairings 16 and the inward-running air-duct 14 and air trunk 15 and this space is used as a stowage compartment for ancillary equipment of the aircraft. In the forward part of each of the two stowage compartments 17 within the fairings 16 there is mounted a gun 18, the gun barrel 19 extends forwardly substantially parallel with the aircraft axis, and the gun muzzle 20 opens into the corresponding air-duct 14 near the forward end of the said duct and is aimed through the air-intake opening 13. In order to reduce to a minimum any interference with the air-stream passing through the air-ducts, a cover or flap may be provided, if desired, to close in the muzzle of each gun, said flaps opening automatically when the guns are fired. The guns 18 are carried upon the exterior of the main strength members 23 of the fuselage and not upon the interior walls of the fairings 16 themselves, since the fairings are only light in construction with a thin-outer-skin of unstressed metal sheeting. The arrangement lends itself to the mounting of the guns near the centre line of the aircraft, and this is an advantage as compared with arrangements where the guns are mounted lower in the fuselage, for example, since the effect of the recoil forces upon the flight path when the guns are fired is reduced. A fore and aft ammunition box may be arranged in the same compartment mounted below the gun, a suitable curved feed duct guiding the ammunition belt from the box into the guns. If desired the gun, box and duct may be packaged as a unit in this compartment, so that loading can be carried out on the ground and the complete unit ready for use be hoisted into the aircraft and stowed in the portion indicated.

In the compartment 17 within each fairing and just to the rear of the gun 18, there is provided a pivotal connection between the upper end of a retractable undercarriage leg 21 and the air craft structure. The undercarriage legs 21 are mounted as far out as possible within the fairings 16 in order to obtain an adequate wheel track, and on retraction, the undercarriage legs and the landing wheels 22 at the lower ends thereof are swung upwardly and rearwardly into the compartments 17, suitable doors being provided in the under parts of the fairings to allow passage of the undercarriage legs, which doors are closed when the legs are fully retracted. It is a considerable advantage to be able to stow under-carriage legs and landing wheels in this manner since with the present-day tendency towards thin swept-back wings, the problem of stowing the undercarriage in the wings in conventional manner is becoming increasingly difficult. By designing the air-intakes 13 and ducts 14 to be somewhat deep and narrow, it will be seen that rather deep and narrow fairings can be provided which in turn afford deep stowage compartments, so that wheels of reasonable diameter and width can be entirely accommodated within said compartments; in fact, the use is envisaged of wheels with larger and lower pressure tyres than can normally be employed when the undercarriage is retracted into the wings, and this is a great advantage to the operational employment of the aircraft in enabling it to land and take-off upon unprepared or partly prepared ground.

The inner side of each stowage compartment is bounded by the structural members 23 of the wall of the fuselage proper, the guns and undercarriage legs being stowed wholly outside the main fuselage structure. Thus this structure is unbroken except where the air-ducts pass through it, and if desired the outer walls of the air-ducts may form part of or contribute to the strength of the fuselage structure. It is not necessary to provide openings in the main fuselage structure to allow passage of the wheels or undercarriage legs or provide for the insertion or withdrawl of ammunition boxes and the like and access to the undercarriage and guns for servicing, loading and so forth, may be had merely by removal of the relatively light air-intake fairings.

While the above description refers to an aircraft with a single engine and in which a pair of side-entry air-intakes are provided, it will be appreciated that the invention is not incompatible with two or more engines within the fuselage, or with air-intakes in other positions.

I claim:

1. In an aircraft of the kind having a jet or gas turbine engine mounted in the fuselage, the construction comprising main stress-carrying structural members forming a fuselage wall, a forwardly-facing scoop-style air-intake provided on the fuselage wall externally of said structural members, a rearwardly-extending air-duct leading from the intake to the engine which air-duct passes in through the structural members forming the fuselage wall on its way to the engine, a fairing on the exterior of the structural members and extending aft from the air-intake opening to fair off the air-intake, said fairing providing a compartment within itself external to the structural members, and ancillary equipment, such as an undercarriage unit or armament, carried from said structural members within said compartment forward of the engine.

2. An aircraft construction as claimed in claim 1, wherein the compartment is bounded on its inner side by the main stress-carrying structural members of the fuselage wall, and at least part of the outer wall of the air-duct contributes to the strength of the fuselage wall.

3. An aircraft construction as claimed in claim 1, wherein two forwardly-facing scoop-style air intakes are provided, one on each side of the fuselage, leading to two air ducts which pass through the side walls of the fuselage and unite together within the same before joining the intake to the engine.

References Cited in the file of this patent

FOREIGN PATENTS

| 667,696 | Great Britain | Mar. 5, 1952 |
| 672,917 | Great Britain | May 28, 1952 |
| 929,925 | France | July 28, 1947 |

OTHER REFERENCES

"Flight" Magazine, April 22, 1948, pp. 430, 431, 432.